(12) United States Patent
Tashiro et al.

(10) Patent No.: US 10,677,148 B2
(45) Date of Patent: Jun. 9, 2020

(54) VARIABLE DISPLACEMENT EXHAUST TURBOCHARGER EQUIPPED WITH VARIABLE NOZZLE MECHANISM

(71) Applicant: MITSUBISHI HEAVY INDUSTRIES ENGINE & TURBOCHARGER, LTD., Sagamihara-shi, Kanagawa (JP)

(72) Inventors: Naoto Tashiro, Tokyo (JP); Yasuaki Jinnai, Tokyo (JP); Hiroyuki Arimizu, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 199 days.

(21) Appl. No.: 15/694,103

(22) Filed: Sep. 1, 2017

(65) Prior Publication Data

US 2018/0038272 A1 Feb. 8, 2018

Related U.S. Application Data

(63) Continuation of application No. 14/232,346, filed as application No. PCT/JP2012/072580 on Sep. 5, 2012, now Pat. No. 9,784,178.

(30) Foreign Application Priority Data

Sep. 28, 2011 (JP) .................................. 2011-213556

(51) Int. Cl.
*F02B 37/12* (2006.01)
*F01D 17/16* (2006.01)
(Continued)

(52) U.S. Cl.
CPC .............. *F02B 37/12* (2013.01); *F01D 9/045* (2013.01); *F01D 17/165* (2013.01); *F02C 6/12* (2013.01);
(Continued)

(58) Field of Classification Search
None
See application file for complete search history.

(56) References Cited

U.S. PATENT DOCUMENTS

| 5,141,338 A | 8/1992 | Asada et al. |
| 6,354,742 B1 | 3/2002 | Iwaki et al. |
| (Continued) | | |

FOREIGN PATENT DOCUMENTS

| CN | 1290222 A | 4/2001 |
| CN | 1307172 A | 8/2001 |
| (Continued) | | |

OTHER PUBLICATIONS

Chinese Office Action and Search Report, dated Jun. 30, 2015, for Chinese Application No. 201280034247.4, along with an English translation.

(Continued)

*Primary Examiner* — Igor Kershteyn
*Assistant Examiner* — Jason G Davis
(74) *Attorney, Agent, or Firm* — Birch, Stewart, Kolasch & Birch, LLP

(57) ABSTRACT

A variable displacement exhaust turbocharger is provided with a plurality of nozzle vanes that are rotatably supported by a nozzle mount, a drive ring that is interlocked with an actuator and fits to a guide part of the nozzle mount, a lever plate having one end coupled to the drive ring and the other end coupled to the nozzle vane, and a variable nozzle mechanism that varies the vane angle of the nozzle vane by rotating the drive ring. A bulge suppressing portion is provided for absorbing bulging occurring on an outer peripheral surface of the guide part, the bulging being caused by the press-fitting of a nail pin into a press-fitting (Continued)

hole in a direction slightly toward the rotational axis with respect to the guide section and following the axial direction of the nozzle mount.

8 Claims, 9 Drawing Sheets

(51) Int. Cl.
  *F02C 6/12* (2006.01)
  *F01D 9/04* (2006.01)
  *F02B 37/24* (2006.01)
(52) U.S. Cl.
  CPC .......... *F02B 37/24* (2013.01); *F05D 2220/40* (2013.01); *F05D 2240/128* (2013.01)

(56) References Cited

U.S. PATENT DOCUMENTS

| | | | |
|---|---|---|---|
| 6,523,913 | B1 | 2/2003 | Lauer et al. |
| 6,962,481 | B2 | 11/2005 | Knauer et al. |
| 7,396,204 | B2 | 7/2008 | Shiraishi et al. |
| 2001/0013339 | A1 | 8/2001 | Jinnai |
| 2002/0047392 | A1 | 4/2002 | Obara |
| 2005/0252210 | A1 | 11/2005 | Shiraishi et al. |
| 2006/0062663 | A1* | 3/2006 | Figura .................. F01D 17/165 415/160 |
| 2010/0202874 | A1 | 8/2010 | Hayashi et al. |

FOREIGN PATENT DOCUMENTS

| | | |
|---|---|---|
| CN | 1692214 A | 11/2005 |
| JP | 9-13980 A | 1/1997 |
| JP | 2002-17063 A | 1/2002 |
| JP | 2002-502771 A | 1/2002 |
| JP | 2003-172145 A | 6/2003 |
| JP | 2006-514191 A | 4/2006 |
| JP | 2007-56791 A | 3/2007 |
| JP | 2011-43119 A | 3/2011 |
| WO | WO 2004/035991 A2 | 4/2004 |
| WO | WO 2008/118833 A1 | 10/2008 |

OTHER PUBLICATIONS

International Preliminary Report on Patentability for PCT/JP2012/072580 dated Apr. 10, 2014 with English Translation.
International Search Report of PCT/JP2012/072580 dated Sep. 5, 2012.
Notice of Allowance for corresponding Japanese Application JP2011-213556 dated Dec. 25, 2012 with an English Translation.
European Office Action, dated Jul. 4, 2017, for European Application No. 12836532.7.
Notice of Allowance effective Feb. 22, 2016 issued in the corresponding Chinese Application No. 201280034247.4 with an English Translation.
European Office Action, dated Jan. 13, 2020, for European Application No. 12836532.7.

* cited by examiner

VARIABLE DISPLACEMENT EXHAUST TURBOCHARGER EQUIPPED WITH VARIABLE NOZZLE MECHANISM

CROSS-REFERENCE TO RELATED APPLICATIONS

This application is a Continuation of copending application Ser. No. 14/232,346, filed on Feb. 5, 2014, which was filed as PCT International Application No. PCT/JP2012/072580 on Sep. 5, 2012, which claims the benefit under 35 U.S.C. § 119(a) to Patent Application No. 2011-213556, filed in Japan on Sep. 28, 2011, all of which are hereby expressly incorporated by reference into the present application.

TECHNICAL FIELD

The present invention relates to a structure for retaining a drive ring rotatable with respect to a nozzle mount in a variable displacement exhaust turbocharger, which is used for an exhaust turbocharger of an internal combustion engine and which is equipped with a variable nozzle mechanism for varying a vane angle of a plurality of nozzle vanes.

BACKGROUND ART

As one variable displacement exhaust turbocharger which is used for an exhaust turbocharger of an internal combustion engine and which is equipped with a variable nozzle mechanism for varying a vane angle of a plurality of nozzle vanes, the technique of JP 2011-43119 is provided.

This technique is illustrated in FIG. 9A, FIG. 9B and FIG. 9C of the attached drawings. FIG. 9A is a plan view of a configuration of a nozzle vane 08 before being connected to a first link member 074. FIG. 9B is a Z arrow view of FIG. 9A. FIG. 9C is an enlarged view of a second shaft end portion of FIG. 9A.

On an opposite side of a fitting part 081 from a vane 064, a protruding portion 085 is provided. The protruding portion 085 is inserted in a hole 074a of a first link member 074 and then pressed in a direction of a center axis S to form a caulking portion.

Then, in a notch area of a notch 082 in a second bearing 066, a press-fitting portion 086 and a non press-fitting portion 087 are provided. The length of the press-fitting portion 086 in the direction perpendicular to the notch 082 is set slightly larger than the length of the hole 074a in this above perpendicular direction.

Meanwhile, the length of the press-fitting portion 086 in a direction parallel to the notch 082 and perpendicular to the center axis S is set slightly smaller or equal to the length of the hole 074 in this perpendicular direction.

Therefore, the notch 082 has the shape that decreases from the press-fitting portion 086 toward the non-press-fitting portion 087 and the protruding portion 085 from the press-fit portion 086 as it goes to the tip.

As the notch 082 has a shape that decreases as it goes to the tip, it is easy to fit the fitting part 081 into the hole 074a of the first link member 074. Thus, when press-fitting the press-fitting portion 086 to the hole 074a, even if a press-fit margin between the press-fitting portion 086 and the hole 074 is set large, the press-fitting force required for press-fitting does not increase excessively and occurrence of the press defects is suppressed.

CITATION LIST

Patent Literature

[PTL 1]
JP 2011-43119 A

SUMMARY

Technical Problem

However, the technique of Patent Literature 1 (JP 2011-43119A) is to eliminate a relative movement between the second bearing 066 and the first link member 074 by inserting the notch 082 into the hole 074a easily by a clearance formed between the non press-fitting portion 082 of the notch 082 of the second bearing 066 and the hole 074a of the first link member 074 and then caulking the protruding portion 085 in the axial direction of the second bearing 066 to press the notch 082 against a wall of the hole 074a.

Therefore, there is no technical disclosure as to how to suppress bulging of the first link member 074 caused by the press-fitting portion 086 inserted in the hole 074a of the first link member 074.

The present invention has been made to solve the above problems, and it is an object of the present invention to improve durable reliability of a variable displacement exhaust turbocharger equipped with a variable nozzle mechanism, by providing a bulge suppressing portion for suppressing a bulging portion generated at an outer peripheral part of a guide part of a nozzle mount when a press-fitting pin is press-fitted into a press-fitting hole formed in the nozzle mount along the axial direction, thereby preventing fixation of an inner peripheral surface of a drive ring and an outer peripheral surface of the guide part.

Solution to Problem

To solve the above issues, the present invention provides a variable displacement exhaust turbocharger which is equipped with a variable nozzle mechanism and is driven by exhaust gas from an engine, the variable displacement exhaust turbocharger comprising:

a plurality of nozzle vanes supported rotatably by a nozzle mount which is fixed to a case including a turbine casing of the variable displacement exhaust turbocharger;

a drive ring which is interlocked with an actuator and is fitted to an annular guide part protruding from a center part of the nozzle mount in an axial direction;

a plurality of lever plates each of which is fitted to a groove formed in the drive ring at one end via a connection pin and is connected to the nozzle vane at the other end;

the variable nozzle mechanism configured to swing the plurality of lever plates by rotation of the drive ring so as to change a vane angle of the plurality of nozzle vanes; and a press-fitting pin which is press-fit to a side of the nozzle mount at a position slightly closer to a rotation axis than the annular guide part, wherein a bulge suppressing portion is provided in at least one of the press-fitting pin or a press-fitting hole formed in the axial direction of the nozzle mount so as to absorb and suppress a bulge of an outer peripheral surface of the annular guide part generated when the press-fitting pin is press-fit in the press-fitting hole.

With the above configuration, by providing the bulge suppressing portion which is configured to suppress bulging of the press-fitting hole of the guide part of the nozzle part out of the outer peripheral surface in the radial direction when press-fitting the pin into the press-fitting hole, it is possible to prevent fixation of the inner peripheral surface of the drive ring and the outer peripheral surface of the guide part.

It is preferable in the present invention that a depth of the press-fitting hole is greater than a thickness of the annular guide part in the axial direction, and the bulge suppressing portion includes an enlarged diameter part which is formed in the press-fitting hole in such a manner that a hole diameter of the press-fitting hole is larger than an outer diameter of the press-fitting pin at least in a range corresponding to the thickness of the annular guide part in the axial direction from an insertion side.

With this configuration, as the bulge suppression portion is formed such that the hole diameter of the press-fitting hole is larger than the outer diameter of the press-fitting pin in a range approximately equivalent to the thickness of the drive ring from the pin insertion side, the bulge suppressing portion is capable of suppressing bulge of the outer peripheral surface of the guide part due to the press-fitting of the pin and also prevent fixation of the inner peripheral surface of the drive ring and the outer peripheral surface of the guide part.

It is also preferable in the present invention that a depth of the press-fitting hole is greater than a thickness of the annular guide part in the axial direction, and the bulge suppressing portion includes a reduced diameter part which is formed in the press-fitting pin in such a manner that an outer peripheral part of the press-fitting pin is smaller than a diameter of the press-fitting hole at least in a range corresponding to the thickness of the annular guide part in the axial direction from a base part toward a tip part of the press-fitting pin.

With this configuration, as the bulge suppressing portion is formed such that the outer diameter of the press-fitting pin is smaller than the hole diameter of the press-fitting hole in a range approximately equivalent to the thickness of the drive ring from the pin insertion side, the bulge suppressing portion is capable of suppressing bulge of the outer peripheral surface of the guide part due to the press-fitting of the pin and also prevent fixation of the inner peripheral surface of the drive ring and the outer peripheral surface of the guide part.

Moreover, the press-fitting pin can be precisely formed by lathe machining, whereby cost reduction can be achieved.

It is also preferable in the present invention that the bulge suppressing portion includes a notch which is formed along an axial direction of the press-fitting pin in such a manner that the notch is on a side nearer to the outer peripheral surface of the annular guide part.

With this configuration, the press-fitting area can be longer and thus, perpendicularity of the press-fitting pin with respect to the nozzle mount is stabilized.

It is also preferable in the present invention that the bulge suppressing portion comprises a cylindrical spring pin which has a C-shaped cross-section and is press-fitted into the press-fitting hole, and a pin which is press-fitted into an inner cylindrical part of the cylindrical spring pin.

With this configuration, as the C-shaped notch portion of the cylindrical spring pin absorbs the bulge caused by press-fitting of the pin, it is possible to prevent bulging on the outer peripheral surface of the guide part and also prevent fixation of the inner peripheral surface of the drive ring and the outer peripheral surface of the guide part.

Therefore, it is no longer necessary to regulate orientation when press-fitting the nail pin 20. This facilitates the press-fitting work.

It is also preferable in the present invention that the bulge suppressing portion is a cutout portion of the outer peripheral surface of the guide part which is cut out in advance in an amount equivalent to a bulge amount.

With this configuration, the bulge suppressing portion is formed by predicting a bulge amount of the bulging portion caused by press-fitting the pin, and cutting out a portion in the bulge amount. The cutout portion is restored by a bulge caused by press-fitting of the pin, and the cutout portion is restored to a smooth peripheral surface. As a result, it is possible to prevent fixation of the inner peripheral surface of the drive ring and the outer peripheral surface of the guide part.

Moreover, as it is no longer necessary to regulate orientation of the pin, the press-fitting work is facilitated. Further, as the pin is press-fitted over the entire circumference of the pin, it is to improve fixing of the pin with respect to the nozzle mount.

It is also preferable in the present invention that the press-fitting pin is a headed pin with a flange-shaped head for retaining an inner peripheral part of the drive ring so that inner peripheral part of the drive ring does not come off from the guide part.

With this configuration, the drive ring is retained by the flange-shaped head of the press-fitting pin so as to prevent the drive ring from falling out from the guide part. This simplifies the structure, whereby cost reduction can be achieved and the drive ring can be retained reliably.

It is also preferable in the present invention that the press-fitting pin is a stopper pin which is configured to restrict an opening degree of the nozzle vane by contacting a side face of the lever plate.

With this configuration, as the press-fitting pin is a stopper pin which is configured to restrict an opening degree of the nozzle vane by contacting a side face of the lever plate, the structure is simplified by making the edge of the outer peripheral part of the guide part into a smooth outer peripheral surface, and the performance of the variable nozzle mechanism is improved by accurately regulating the swing range of the lever plate.

It is preferable in the present invention that the press-fitting pin is a lock pin for positioning between the bearing housing and the nozzle mount.

With this configuration, as the press-fitting pin is a lock pin for positioning between the bearing housing and the nozzle mount, the structure is simplified and the performance of the variable nozzle mechanism is improved by making the edge of the outer peripheral part of the guide part into a smooth outer peripheral surface.

Advantageous Effects

By providing the bulge suppressing portion which is configured to suppress bulging of the press-fitting hole of the guide part of the nozzle part out of the outer peripheral surface in the radial direction when press-fitting the pin into the press-fitting hole, it is possible to prevent fixation of the inner peripheral surface of the drive ring and the outer peripheral surface of the guide part.

Moreover, as the bulge suppressing portion is formed such that outer peripheral part of the nail pin is smaller than the hole diameter of the press-fitting hole, the pin can be precisely formed by lathe machining, whereby cost reduction can be achieved.

Further, by adopting the stopper pin for restricting swinging of the lever plate which is configured to operate opening of the nozzle vane, it is possible to achieve improved easiness of press-fitting work and reduced cost.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

Figure 1:
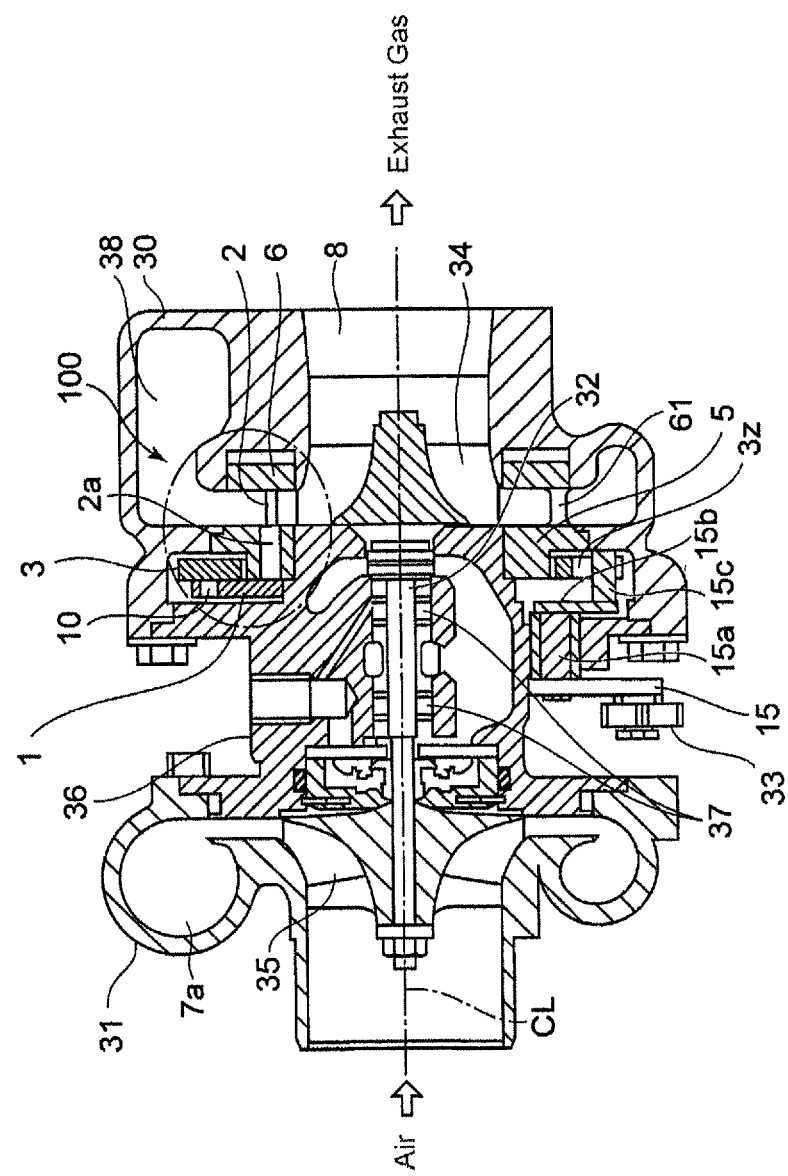
FIG. 1 is a longitudinal cross-sectional view of a main part of a variable displacement exhaust turbocharger equipped with a variable nozzle mechanism according to an embodiment of the present invention.

FIG. 1 is a longitudinal cross-sectional view of a main part of a variable displacement exhaust turbocharger equipped with a variable nozzle mechanism according to an embodiment of the present invention.

FIG. 1 illustrates a turbine casing 30, a scroll 38 of a scroll shape formed in an outer peripheral part of the turbine casing 30, a turbine rotor of a radial flow type 34, a compressor 35, a turbine shaft 32 for connecting the turbine rotor 34 and the compressor 35, a compressor housing 31 and a bearing housing 36.

The turbine shaft 32 connecting the turbine rotor 34 and the compressor 35 is rotatably supported by the bearing housing 36 via two bearings 37, 37. The drawing also illustrates an exhaust gas outlet 8 and a rotation axis CL of the exhaust turbocharger.

A plurality of nozzle vanes 2 is arranged on an inner circumferential side of the scroll 38 at equal intervals in the circumferential direction of a turbine and is supported rotatably by a nozzle mount 5. A nozzle shaft 2a is formed on a vane end of the nozzle vane 2 and is rotatably supported by the nozzle mount 5 which is fixed to the turbine casing 30.

On an opposite side of the nozzle shaft 2a from the vane end, the nozzle shaft 2a is connected to a drive ring 3 via a lever plate 1. The drive ring 3 is configured to change a vane angle of the nozzle vane 2 by rotation of the nozzle shaft 2a.

An actuator rod 33 is configured to transmit a reciprocating motion from an actuator (not shown). A drive mechanism 39 is configured to convert the reciprocating motion of the actuator rod 33 into a rotational motion via a link 15 which is fixed to a rotation shaft 15a, and engage a drive pin 15c disposed at one end of a lever 15b whose other end is fixed to the rotation shaft 15a with an engagement groove 3z (see FIG. 2) formed in an outer peripheral part of the drive ring 3 so as to rotate the drive ring 3.

The section surrounded by a dotted line is a variable nozzle mechanism 100 for varying a vane angle of the nozzle vane 2. nozzle shaft 2a.

In the operation of the variable displacement exhaust turbocharger equipped with the variable nozzle mechanism which is configured as illustrated in FIG. 1, exhaust gas from an internal combustion engine (not shown) enters the scroll 38 and flows into the nozzle vanes 2 while swirling along the scroll shape of the scroll 38. After flowing past between the nozzle vanes (an opening area), the exhaust gas flows in the turbine rotor 34 from its outer peripheral side. Then, the exhaust gas flows radially toward the center to perform expansion work in the turbine rotor 34. After performing the expansion work, the exhaust gas flows out in the axial direction and then guided toward the exhaust gas outlet 8 and sent outside of the turbine rotor 34.

In order to control the displacement of this variable displacement turbine, a vane angle of the nozzle vanes 2 at which a flow rate of the exhaust gas through the nozzle vanes 2a becomes a desired flow rate is set by a vane angle controller (not shown) with respect to the actuator. The reciprocal displacement of the actuator with respect to this vane angle is transmitted to the drive ring 3 via the drive mechanism 39 so as to drive and rotate the drive ring 3.

By rotation of the drive ring 3, the lever plate 1 is caused to rotate around the nozzle shaft 2a via a connection pin 10 which is described later. By rotation of the nozzle shaft 2a, the nozzle vane 2 is rotated to the vane angle which is set as to the actuator. As a result, the area between adjacent vanes (the opening area between adjacent vanes) changes.

Figure 2A:
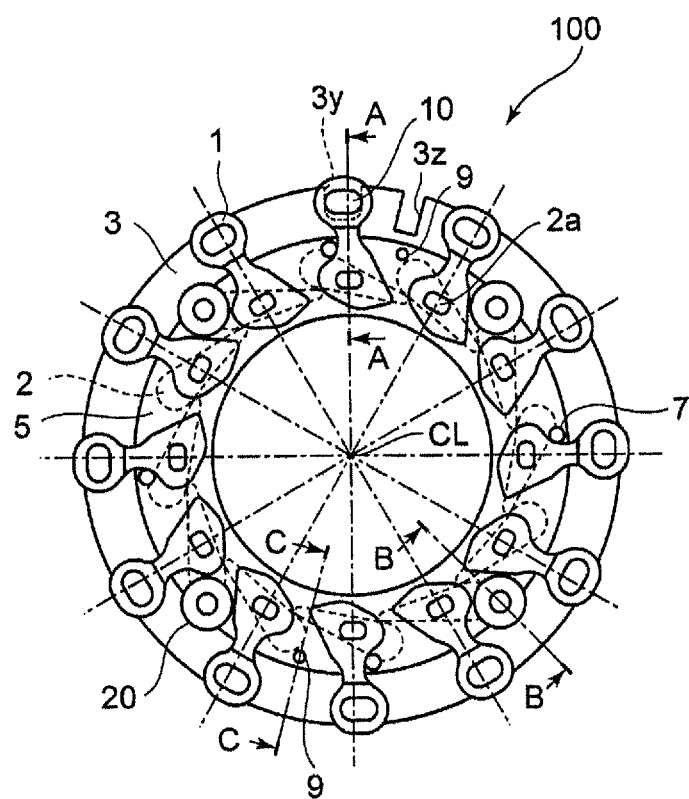
FIG. 2A is a front view of a variable nozzle mechanism according to a first embodiment of the present invention, which is taken from a lever plate side.
Figure 2B:
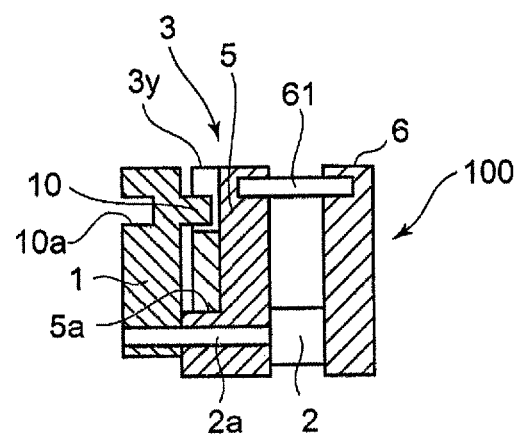
FIG. 2B is a cross-sectional view in A-A of FIG. 2A.

FIG. 2A is a front view of the variable nozzle mechanism, which is taken from the lever plate 1 side. FIG. 2B is a cross-sectional view in A-A of FIG. 2A. The drawings illustrate a variable nozzle mechanism 100 for varying the vane angle of the nozzle vanes 2. The variable nozzle mechanism 100 is configured as described below.

The drive ring 3 formed in a disk shape is externally fitted to a guide part 5a of a cylinder shape (a ring shape) which protrudes in the direction of the axis CL of the nozzle mount 5 (in the same direction as the rotation axis of the exhaust turbocharger) to be rotatably supported. Further, grooves 3y, with which the connection pins 10 engage, are formed at an outer circumferential side at equal intervals in the circumferential direction. The grooves 3y are described later. The drive mechanism 39 has a drive groove 3z where the actuator rod 33 engages.

The same number of the lever plates 1 as the grooves 3y of the drive ring 3 is provided at equal intervals in the circumferential direction.

Each of the lever plates 1 is fitted in the groove 3y of the drive ring 3 via the connection pin 10 on an outer circumferential side (one end) and is connected to the nozzle shaft 2a fixed to the nozzle vane 2 on an inner circumferential side (the other end).

Further, the nozzle shaft 2a is supported about its axis to be rotatable with respect to the nozzle mount 5.

A nozzle plate 6 of an annular shape is connected to the nozzle mount 5 by a plurality of nozzle supports 61.

A stopper pin 7 protrudes from a center part of the nozzle mount 5 in the direction of the axis CL, and a plurality of stopper pins 7 is arranged circumferentially at equal intervals in an outer peripheral part of an end surface of the guide part 5a of a cylindrical shape (a ring shape). Further, the plurality of stopper pins 7 (four stopper pins in this embodiment) is press-fitted in a plurality of press-fitting holes (not shown) along the direction of the axis CL.

The stopper pin 7 is a so-called opening restricting member for restricting swinging of the lever plate 1 at a closed position of the nozzle vanes (a closed position of the opening area), the lever plate 1 being configured to swing about the nozzle shaft 2a in response to rotating movement of the driving ring 3.

A lock pin 9 is a positioning pin for improving assembling accuracy of the bearing housing 36 and the nozzle mount 5. By restricting an assembling angle of the bearing housing 36 and the nozzle mount 5 (assembling accuracy), a driving amount of the drive ring 3 is accurately transmitted with respect to a driving amount of the actuator, and the opening degree of the nozzle vane 2 can be precisely controlled, thereby fully exerting the performance of the turbocharger.

In the variable nozzle mechanism, as illustrated in FIG. 2B, the lever plate 1 is arranged on an outer side in the axial direction (on the exhaust gas outlet 8 side in FIG. 1), and between a side face of the lever plate 1 and a side face of the nozzle mount 5, the drive ring 3 is arranged in the state where the drive ring 3, the lever plate 1 and the nozzle mount 5 are arranged next to one another in the axial direction.

The connection pin 10 is formed integrally with a base material by pressurizing one side face of each of the lever plates 1 by a press machine so that a rectangular depression 10a is formed on the side face and a rectangular protrusion is formed on the other side face by extrusion.

The drive ring 3 of the variable nozzle mechanism 100 having such configuration needs to be retained with respective appropriate clearances between the nozzle mount 5 and the lever plate 1 and between the inner peripheral surface of the drive ring 3 and the outer peripheral surface of the guide part 51.

If the clearance is greater than a specified value, the drive ring 3 rocks in the axial direction of the nozzle mount 5. This can result in one-side hitting of a thrust-direction end of a sliding face of the drive ring 3 against the guide part (one-side contact), which causes fixation.

On the other hand, if the clearance is smaller than the specified value, the sliding resistance of the nozzle mount 5 increases, which causes fixation of the sliding portion.

To prevent the fixation, it is desired to ensure an appropriate amount of clearance in the thrust direction of the nozzle mount 5 and the drive ring. To maintain the appropriate amount of clearance, a nail pin which is a press-fitting pin with a flange extending in the radial direction is press-fitted in the outer peripheral part of the end face of the guide part 5a in the thrust direction so as to secure an appropriate clearance by means of the flange of the press-fitting pin.

First Embodiment

Figure 3B:
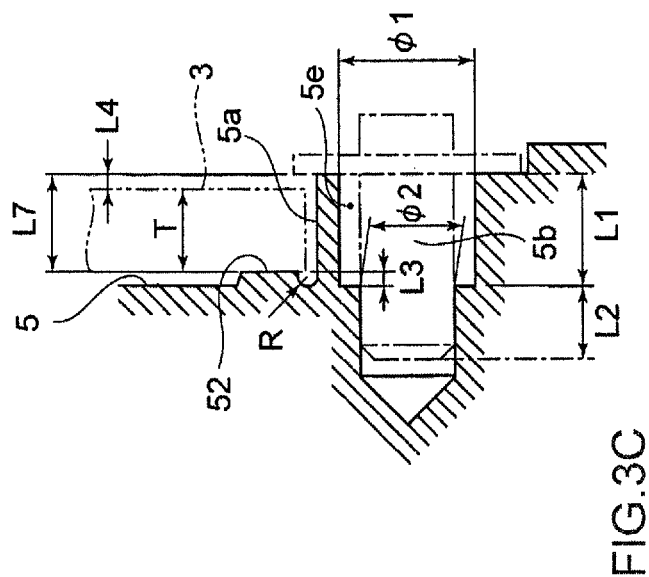
FIG. 3B is an enlarged view of a press-fitting hole on a nozzle mount side according to the first embodiment of the present invention.
Figure 3C:
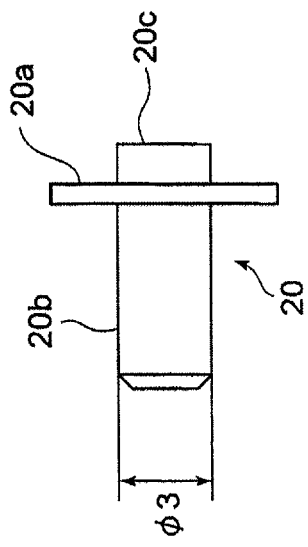
FIG. 3C is a schematic view of the nail pin according to the first embodiment of the present invention.
Figure 3A:
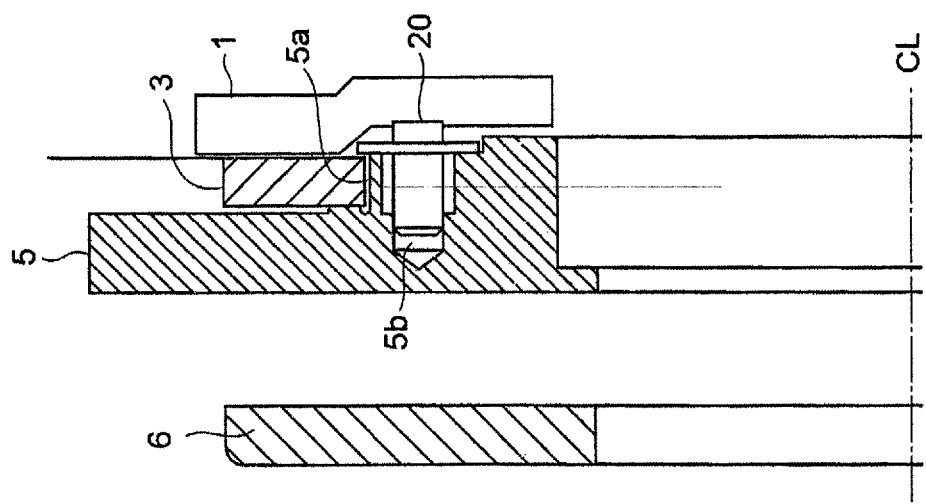
FIG. 3A is an enlarged cross-sectional view of a part where a nail pin is press-fitted in a nozzle mount according to a first embodiment of the present invention, which is taken in B-B of FIG. 2A.

FIG. 3A is an enlarged cross-sectional view of a part where a nail pin serving as the press-fitting pin is press-fitted in the nozzle mount 5 according to a first embodiment of the present invention, which is taken in B-B of FIG. 2A. FIG. 3B is an enlarged view of a press-fitting hole on the nozzle mount. FIG. 3C is a schematic view of the nail pin to be press-inserted in the press-fitting hole of FIG. 3B.

In FIG. 3A, the drive ring 3 of a disk shape is externally fitted with a small clearance to the guide part 5a of a cylinder shape (a ring shape) which protrudes in the axial direction of the nozzle mount 5.

A nail pin 20 has a flange portion 20a to prevent rocking of the drive ring 3 in the direction of the axis CL of the nozzle mount 5 during rotation of the drive ring 3. This nail pin 20 is press-fitted in a press-fitting hole 5b.

Therefore, the press-fitting position of the nail pin 20 is disposed slightly closer to the center axis CL of the nozzle mount 5 from an outer peripheral line of the end face of the cylindrical guide part 5a, and a plurality of the press-fitting positions is arranged at equal intervals in the circumferential direction.

FIG. 3B is a detailed view of the press-fitting hole 5b. FIG. 3C is an illustration of the nail pin 20 to be press-fitted in the press-fitting hole 5b.

The press-fitting hole 5b is formed in the outer peripheral part of the end face of the guide part 5a along the axis CL of the nozzle mount 5, and a plurality of the press-fitting holes 5b is arranged at equal intervals in the circumferential direction.

The press-fitting hole 5b changes in hole diameter at two stages along an axis of the hole. Specifically, the hole diameter of the press-fitting hole 5b is ø1 on an opening side where the nail pin 20 is inserted and changes to ø2 on its deeper side. The length L1 of the section with the hole diameter ø1 is slightly larger than the width T of the sliding face of the drive ring 3 (thickness in the axial direction) by length L3. In other words, the width T of the sliding face of the drive ring 3 is maintained within the range of L1.

The hole diameter ø2 is smaller than a diameter ø3 of a tip part of the nail pin 20, and the hole diameter ø2 and the diameter ø3 are formed according to a dimensional relationship of press-fitting. The length L2 of the tip part of the pin 20 (press-fit margin) which is inserted in the hole diameter ø2 is set so that the nail pin 20 does not come out from the press-fitting hole 5b easily during the operation of the drive ring 3.

As illustrated in FIG. 3C, the nail pin 20, however, has a constant pin diameter ø3 from the tip to the flange portion 20a.

A protruding portion 20c is a portion where a press-fitting tool is abutted when press-fitting the nail pin 20 into the press-fitting hole 5b. Without the protruding portion 20c, a pin portion 20b deforms during insertion of the nail pin 20 due to the press-fitting pressure acting on the pin portion 20b. The deformation of the pin portion 20b accompanies deformation of the flange portion 20a. Therefore, the protruding portion 20c is provided to prevent deformation of the nail pin 20 and facilitate assembling thereof.

Further, a height L7 of the guide part 5a is set so that an appropriate clearance L4 is secured between the flange portion 20a of the nail pin 20 and the drive ring 3 when the nail pin 20 is press-fitted into the press-fitting hole 5b.

Furthermore, as the space 5e serving as a bulge suppressing portion is formed in L1 section of the nail pin 20 and the press-fitting hole 5b, although a section of the press-fitting hole 5b of the nozzle mount 5 on the drive ring 3 side is thin and has low rigidity, it is possible to prevent outward bulging of the section where the sliding face width (T) of the drive ring 3 is located.

A relief R is provided in a section of connection between a protruding portion 52 on a side face of the nozzle mount 5 (a contact face with the drive ring 3) and the guide part 5a so that the edge of the sliding face with width T of the drive ring reliably contacts the guide part 5a.

By ensuring that the drive ring 3 contacts the guide part 5a in the entire range of the sliding face of the drive ring 3, it is possible to reduce rocking of the drive ring 3 in the thrust direction during rotation of the drive ring 3, thereby preventing the fixation of the edge of the sliding face width of the drive ring and the guide part 5a.

Further, the protruding portion 52 is formed in a disk shape on an outer circumferential side of the relief R of the side face and constitutes a contact face where the radial-direction side face of the drive ring 3 contacts. The protruding portion 52 is provided to reduce frictional resistance between the side face of the nozzle mount and the radial-direction side face of the drive ring 3, thereby enhancing smooth rotation of the drive ring 3.

With the above configuration, as the space 5e serving as a bulge suppressing portion is formed in L1 section of the nail pin 20 and the press-fitting hole 513, press-fitting of the nail pin 20 does not generate a bulging portion on the surface of the guide part 5a in the section where the sliding face width (T) of the drive ring 3 is located. Therefore, it is possible to maintain the surface of the guide part 5a smooth and prevent the fixation of the drive ring 3 and the guide part 5a.

Moreover, as the diameter of the press-fitting hole 5b in the section L1 is large, press-fitting work is facilitated.

Second Embodiment

A second embodiment will be described in reference to FIG. 4.

The structure is the same as the first embodiment, except for press-fitting of a lock pin serving as the press-fitting pin for positioning between the nozzle mount and the bearing housing on the outer peripheral part of the nozzle mount 5. Thus, structures such as the variable nozzle mechanism will not be described further herein.

In addition, for parts of the same shape with the same effect, are assigned the same reference numerals, and a description thereof will be omitted.

Second Embodiment

Figure 4:
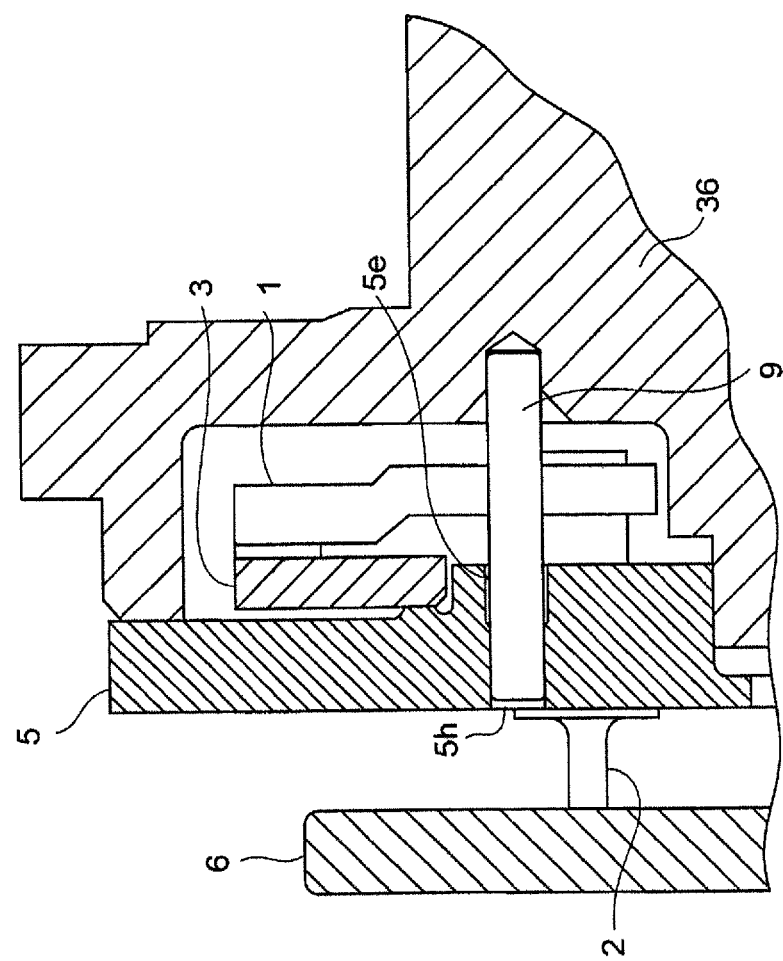
FIG. 4 is a partial enlarged view of a C-C section of FIG. 2A where a lock pin is press-fitted in the nozzle mount according to a second embodiment of the present invention.

FIG. 4 is a partial enlarged view of a C-C section of FIG. 2A where a lock pin 9 is press-fitted in the nozzle mount 5 according to a second embodiment of the present invention.

Although the bearing housing 36 is not shown in FIG. 2A, the bearing housing 36 is illustrated in FIG. 4 to clarify the disposition of the lock pin 9.

FIG. 4 shows the nozzle mount 5 and the drive ring 3. The drive ring 3 is externally fitted to the guide part 5a of the nozzle mount 5. The connection pin 10 formed in the lever plate 1 engages with the depression 10a formed in the outer peripheral part of the drive ring 3 so as to rotate the lever plate 1 and adjust the vane angle of the nozzle vane 2.

In the vicinity of the outer peripheral part of the guide part 5a of the nozzle mount 5, a plurality of press-fitting holes 5h is formed along the axis CL of the nozzle mount 5. In the plurality of press-fitting holes 5h, a plurality of lock pins 9 is press-fitted. The lock pins 9 serve as the press-fitting pins for positioning between the nozzle mount 5 and the bearing housing 36.

The press-fitting hole 5h has a hole diameter allowing the space 5e to be formed in an amount of the tip part of the guide part 5a (in section corresponding to L1 of FIG. 3B), the space 5e serving as a bulge suppressing portion for preventing bulging of the outer peripheral part of the guide part 5a during press-fitting of the lock pin 9.

Further, the section on a deeper side of the press-fitting hole from the space 5e (in a section corresponding to L2 of FIG. 3B) is where the lock pin 9 is press-fitted.

An opposite end of the lock pin 9 from the press-fitting portion being press-fitted is fitted to the bearing housing 36, thereby positioning the nozzle mount 5 with precision.

With this configuration, as the space 5e serving as a bulge suppressing portion is formed in a L1 corresponding section of the press-fitting hole 5h and the lock pin 9, press-fitting of the lock pin 9 does not generate a bulging portion on the surface of the guide part 5a. Therefore, it is possible to maintain the surface of the guide part 5a smooth and prevent the fixation of the drive ring 3 and the guide part 5a.

Moreover, as the diameter of the press-fitting hole 5b in the section L1 is large, press-fitting work is facilitated.

Further, since the assembling accuracy of the bearing housing 36 and the nozzle mount 5 is improved, a driving amount of the drive ring 3 is transmitted accurately relative to a driving amount of the actuator, and the opening of the nozzle vane 2 can be precisely controlled, thereby exerting sufficient performance of the turbocharger.

Furthermore, the stopper pin 7 for restricting the opening degree of the nozzle vane 2 have configuration similar to the aforementioned lock pin 9 and thus will not be described further.

Third Embodiment

A third embodiment will be described in reference to FIG. 5A, FIG. 5B and FIG. 5C.

The structure is the same as the first embodiment, except for press-fitting of a nail pin 21 in the nozzle mount 51. Thus, structures such as the variable nozzle mechanism will not be described further herein.

In addition, for parts of the same shape with the same effect, are assigned the same reference numerals, and a description thereof will be omitted.

Figure 5B:
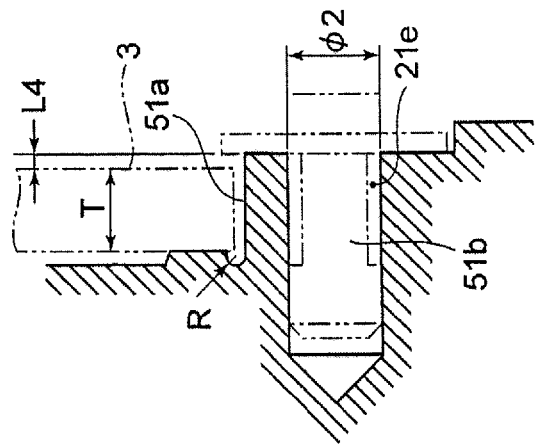
FIG. 5B is an enlarged view of a press-fitting hole on the nozzle mount side according to the third embodiment of the present invention.
Figure 5C:
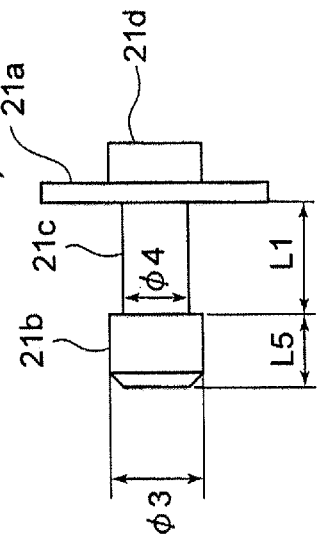
FIG. 5C is a schematic view of the nail pin according to the third embodiment of the present invention.
Figure 5A:
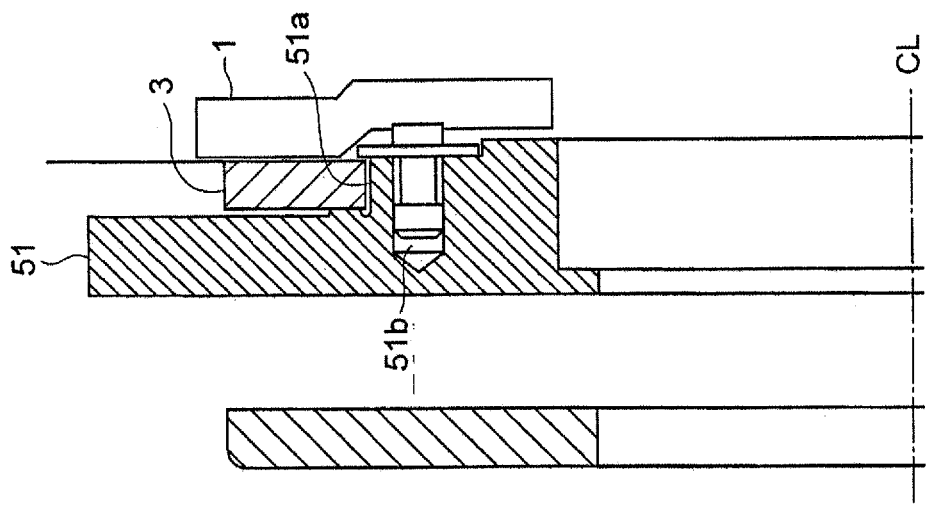
FIG. 5A is an enlarged cross-sectional view of a section where a nail pin according to a third embodiment of the present invention is press-fitted in the nozzle mount.

FIG. 5A is an enlarged cross-sectional view of a section where a nail pin according to the third embodiment of the present invention is press-fitted in the nozzle mount. FIG. 5B is an enlarged view of a press-fitting hole on the nozzle mount side. FIG. 5C is a schematic view of the nail pin to be inserted in the press-fitting hole of FIG. 5B.

FIG. 5A shows a nozzle mount 51 and a lever plate 1. In FIG. 5A, the drive ring 3 is externally fitted to a guide part 51a of the nozzle mount 51.

FIG. 5B illustrates a press-fitting hole 51b where a nail pin 21 is press-fitted. FIG. 5C illustrates the nail pin 21 to be fitted to the press-fitting hole 51b.

The press-fitting hole 51b has a diameter 102 and is formed in the outer peripheral part of the end face of the guide part 51a along the axis CL of the nozzle mount 51, and a plurality of the press-fitting holes 51b is arranged in the peripheral part at equal intervals in the circumferential direction.

The nail pin 21 is a press-fitting pin to be press-fitted in the press-fitting hole 51b. The nail pin 21 is formed in a diameter ø3 at a tip part 21b and in a diameter ø4 at a reduced diameter part 21c between the diameter ø3 and a flange portion 21a, and diameter ø3>diameter ø4.

The length L1 of the diameter ø4 section of the reduced diameter part 21c is determined to secure a clearance L4 between the side face of the drive ring 3 and the flange portion 21a (appropriate clearance L1=t+L4).

The length L5 of the diameter ø3 of the tip part 21b (press-fit margin) is set so that the nail pin 21 does not come out from the press-fitting hole 51b easily during the operation of the drive ring 3 when inserting the nail pin 21 into the press-fitting hole 51b.

Further, each of the tip part 21b of the nail pin 21 and the press-fitting hole 51b is formed in interference-fitting dimension of a respective elastic deformation region so that the section (L1) of the press-fitting hole 51b opposing the drive ring does not plastically deform when press-fitting the nail pin 21 into the press-fitting hole 51b.

With this configuration, as the bulge suppressing portion 21e is formed in the L1 section of the press fitting hole 51b and the nail pin 21, press-fitting of nail pin 21 does not generate a bulging portion on the surface of the guide part 51a in the section where the sliding face width (T) of the drive ring 3 is located. Therefore, it is possible to maintain the surface of the guide part 51a smooth and prevent the fixation of the drive ring 3 and the guide part 51a.

Moreover, the nail pin 21 can be formed to have a stepped portion, etc. by lathe machining, whereby cost reduction can be achieved.

This embodiment is also applicable to the case where a pin-shape member other than the nail pin, such as the lock pin and the stopper pin for restricting the opening of the nozzle vane, is press-fitted in the nozzle mount.

Fourth Embodiment

A fourth embodiment will be described in reference to FIG. 6A, FIG. 6B, FIG. 6C and FIG. 6D.

The structure is the same as the second embodiment, except for a shape of the nail pin. Thus, structures except for the nail pin will not be described further herein.

In addition, for parts of the same shape with the same effect, are assigned the same reference numerals, and a description thereof will be omitted.

Figure 6A:
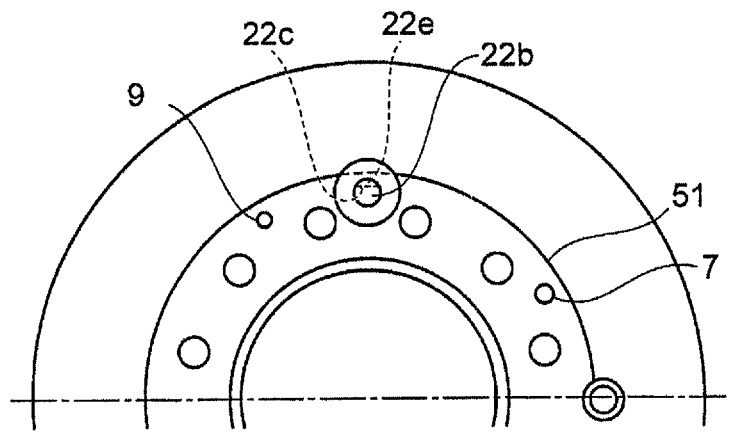
FIG. 6A is a schematic view of a nozzle mount and a nail pin according to a fourth embodiment of the present invention, illustrating a direction of a notch formed on the nail pin with respect to the nozzle mount.
Figure 6B:
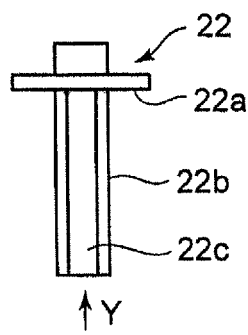
FIG. 6B is a schematic view of the nail pin having a notch according to the fourth embodiment of the present invention.
Figure 6C:
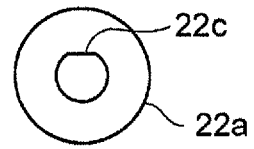
FIG. 6C is a view on Y arrow of FIG. 6B.
Figure 6D:
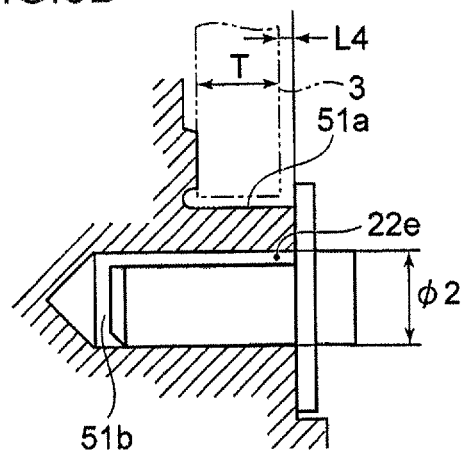
FIG. 6D is a schematic view of the state where the nail pin is press-fitted in a press-fitting hole according to the fourth embodiment of the present invention.

FIG. 6A is a schematic view of a nozzle mount and a nail pin according to a fourth embodiment of the present invention, illustrating a direction of a notch formed on the nail pin with respect to the nozzle mount. FIG. 6B is a schematic view of the nail pin having the notch. FIG. 6C is a view on Y arrow of FIG. 6B. FIG. 6D is a schematic view of the state where the nail pin is press-fitted in the press-fitting hole.

A nail pin 22 of this embodiment includes a notch 22c of a belt shape which is formed in a pin portion 22b along an axial direction of the pin portion 22b as illustrated in FIG. 6B and FIG. 6C.

The press-fitting hole 5b is formed in the outer peripheral part of the end face of the guide part 51a along the axis CL of the nozzle mount 51, and a plurality of the press-fitting holes 5b is arranged in the peripheral part at equal intervals in the circumferential direction.

As illustrated in FIG. 6A, when press-fitting the nail pin 22 into the press-fitting hole 51b, the nail pin 22 is press-fitted with the notch 22 facing the drive ring 3 side.

FIG. 6D illustrates the state where the nail pin 22 is press-fitted in the press-fitting hole 51b. In the drawing, a bulge suppressing portion 22e is formed on the drive ring 3 side.

With the above configuration, as the bulge suppressing portion is formed by the notch 22c, press-fitting of the nail pin 20 does not generate a bulging portion on the surface of the guide part 51a in the section where the sliding face width (T) of the drive ring 3 is located. Therefore, it is possible to maintain the surface of the guide part 51a smooth and prevent the fixation of the drive ring 3 and the guide part 51a.

Moreover, the press-fitting area becomes longer across the pin portion 22b and thus, perpendicularity of the nail pin with respect to the nozzle mount is stabilized.

This embodiment is also applicable to the case where a pin-shape member other than the nail pin, such as the lock pin and the stopper pin for restricting the opening of the nozzle vane, is press-fitted in the nozzle mount.

Fifth Embodiment

A fifth embodiment will be described in reference to FIG. 7A, FIG. 7B, FIG. 7C and FIG. 7D.

The structure is the same as the second embodiment, except for the configuration for press-fitting the nail pin 21 into the press-fitting hole of the nozzle mount via a cylindrical spring pin. Thus, structures such as the variable nozzle mechanism will not be described further herein.

In addition, for parts of the same shape with the same effect, are assigned the same reference numerals, and a description thereof will be omitted.

Figure 7A:
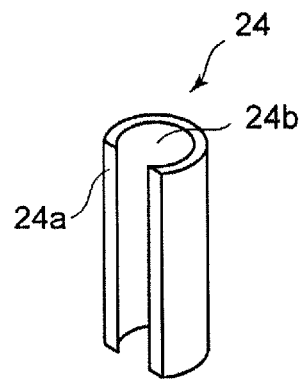
FIG. 7A is an oblique view of a cylindrical spring pin according to a fifth embodiment of the present invention.
Figure 7B:
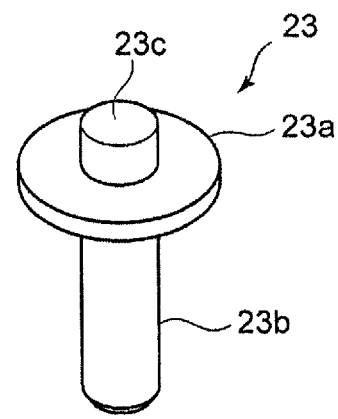
FIG. 7B is a schematic oblique of a nail pin to be press-fitted in the cylindrical spring of FIG. 7A.
Figure 7C:
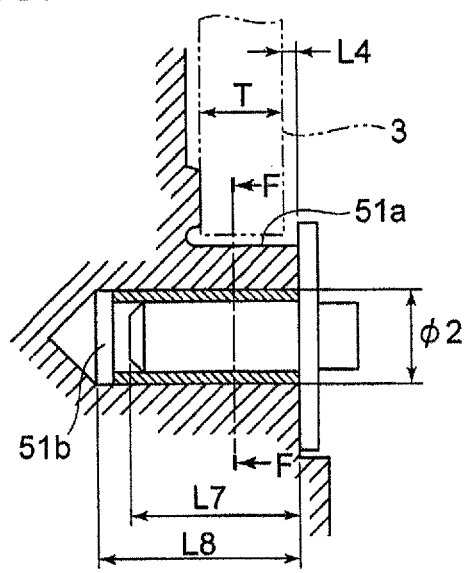
FIG. 7C is a schematic view of the state where the nail pin is press-fitted in the press-fitting hole via the cylindrical spring pin according to the fifth embodiment of the present invention.
Figure 7D:
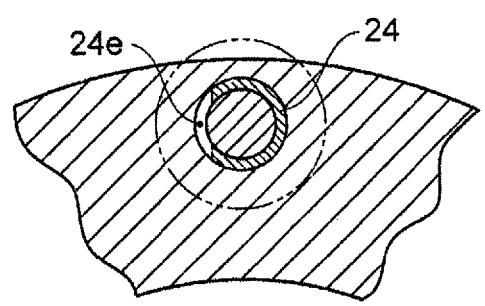
FIG. 7D is a view of F-F arrow of FIG. 7C.

FIG. 7A is an oblique view of a cylindrical spring pin according to the fifth embodiment of the present invention. FIG. 7B is a schematic oblique of a nail pin to be press-fitted in the cylindrical spring of FIG. 7A. FIG. 7C is a schematic view of the state where the nail pin is press-fitted in the press-fitting hole via the cylindrical spring pin. FIG. 7D is a view of F-F arrow of FIG. 7C.

In FIG. 7A, a cylindrical spring pin 24 has a notch 24a formed by cutting out a portion of a cylindrical shape thereof along an axis of the cylindrical shape. The cylindrical spring pin 21 has a substantially C-shaped cross-section in a direction perpendicular to an axis of the cylindrical shape.

In FIG. 7B, a nail pin 23 comprises a pin portion 23b which is press-fitted in the press-fitting hole 51b, a flange portion 23a for restricting rocking of the drive ring 3, and a protrusion 23c serving as a receiving part for a press-fitting tool during the press-fitting.

FIG. 7C illustrates the state where the nail pin 23 is press-fitted in the press-fitting hole 51b via the cylindrical spring pin 24.

The press-fitting hole 51b is formed in the outer peripheral part of the end face of the guide part 51a along the axis CL of the nozzle mount 51, and a plurality of the press-fitting holes 51b is arranged in the peripheral part at equal intervals in the circumferential direction.

The cylindrical spring pin 24 is press-fitted press-fitting hole 51b in such a state that an outer diameter of the cylindrical spring pin 24 is in an interference-fitting state with respect to a diameter ø2 of the press-fitting hole 51b.

The nail pin 23 as the press-fitting pin is press-fitted in an inner cylindrical part 24b of the cylindrical spring pin 24 in an interference-fitting state.

Further, each of the length L7 of the pin portion 23b of the nail pin 23 and the length L8 of the cylindrical spring pin 24 is preferably greater than the width T of the sliding face of the drive ring 3.

The pressure acting on the outer peripheral part of the guide part 51a is uniformized in the thrust direction by press-fitting the cylindrical spring pin 24 and the nail pin 23 so that the clearance between the outer peripheral surface of the guide part 51a and the inner peripheral surface of the drive ring 3 does not change in the thrust direction.

FIG. 7D is a view of F-F arrow of FIG. 7C, and the cylindrical spring pin 24 is press-fitted in the press-fitting hole 51b in the state where the notch 24a of the cylindrical spring pin 24 is disposed in the circumferential direction of the guide part 51a in this embodiment.

The cylindrical spring pin 24 deforms when the nail pin 23 is press-fitted in the inner cylindrical part 24b of the cylindrical spring pin 24, and this deformation can be absorbed by the notch 24a.

Therefore, the notch 24a serves as the bulge suppressing portion 24e.

With this configuration, the notch 24a of the cylindrical spring pin 24 is provided to accommodate press-fitting of the nail pin 23 and thus, press-fitting of the nail pin 23 is absorbed by the notch 24a of the cylindrical spring pin 24. Therefore, it is possible to prevent bulging of the outer peripheral surface of the guide part 51a due to press-fitting of the nail pin 23 and also prevent the fixation of the inner peripheral surface of the drive ring 3 and the outer peripheral surface of the guide part 5a.

Therefore, it is no longer necessary to regulate orientation when press-fitting the nail pin and the cylindrical spring pin. This achieves improved easiness of press-fitting work and reduced cost.

This embodiment is also applicable to the case where a pin-shape member other than the nail pin, such as the lock pin and the stopper pin for restricting the opening of the nozzle vane, is press-fitted in the nozzle mount.

Sixth Embodiment

A sixth embodiment will be described in reference to FIG. 8A, FIG. 8B and FIG. 8C.

The structure is the same as the first embodiment, except for the configuration of the nozzle mount. Thus, structures other than the nozzle mount will not be described further herein.

In addition, for parts of the same shape with the same effect, are assigned the same reference numerals, and a description thereof will be omitted.

Figure 8A:
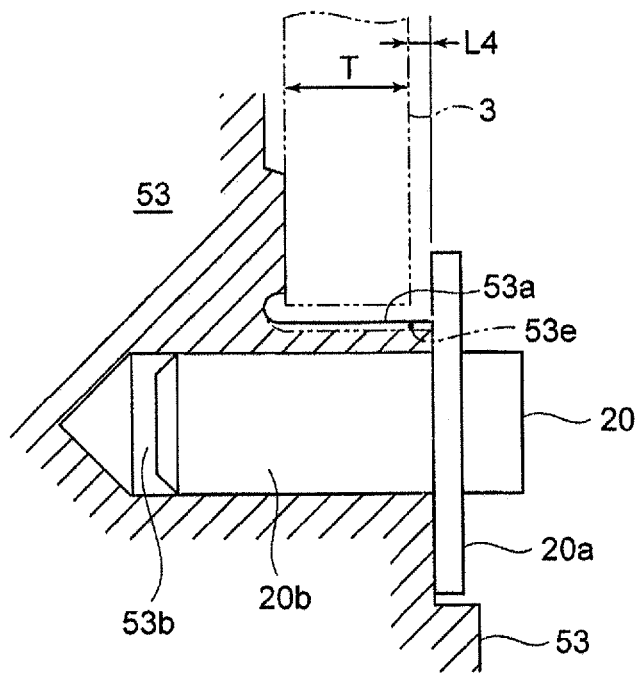
FIG. 8A is a partial enlarged view of the state where a nail pin according to a sixth embodiment of the present invention is press-fitted in the nozzle mount.

FIG. 8A is a partial enlarged view of the state where a nail pin according to a sixth embodiment of the present invention is press-fitted in a nozzle mount. FIG. 8B is a partial enlarged view taken from the lever plate side, before press-fitting of the nail pin into the nozzle mount. FIG. 8C is a partial enlarged view taken from the lever plate side, after press-fitting of the nail pin into the nozzle mount.

In FIG. 8A, a press-fitting hole 53b has been formed in a nozzle mount 53 along an axis CL of the nozzle mount 53, and a plurality of the press-fitting holes 53b is arranged at an outer peripheral part of an end face of a guide part 53a at equal intervals in the circumferential direction.

Figure 8B:
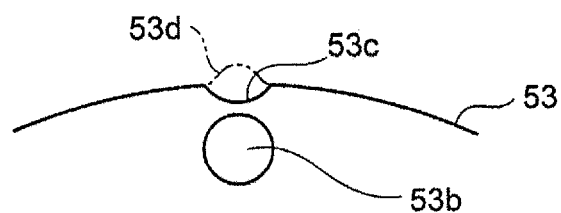
FIG. 8B is a partial enlarged view taken from the lever plate side, before press-fitting of the nail pin into the nozzle mount according to the sixth embodiment of the present invention.

As illustrated in FIG. 8B, a portion is cut off from the outer peripheral surface of the guide part 54a of the nozzle mount 53 in a shape equivalent to a predicted bulge, so as to form a notch 53c serving as a bulge suppressing portion. The predicted bulge is an bulge predicted as to a section where the press-fitting hole 53b and the sliding face side of the drive ring oppose each other, which bulges out of the guide part 53a at the press-fitting of the nail pin 20.

Figure 8C:
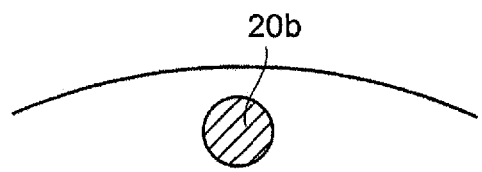
FIG. 8C is a partial enlarged view taken from the lever plate side, after press-fitting of the nail pin into the nozzle mount according to the sixth embodiment of the present invention.
Figure 9A:
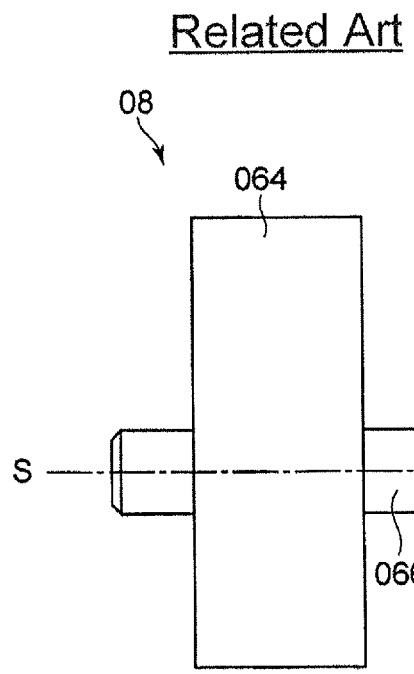
FIG. 9A is an illustration of the related art.
Figure 9B:
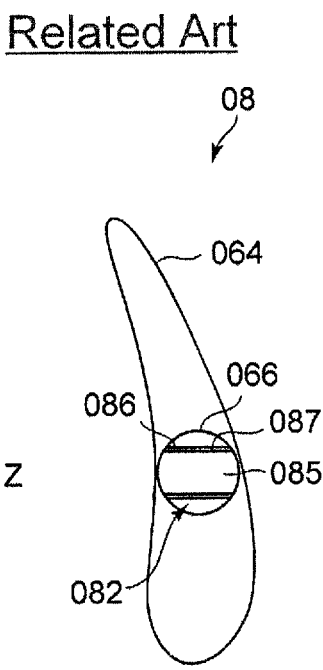
FIG. 9B is an illustration of the related art.
Figure 9C:
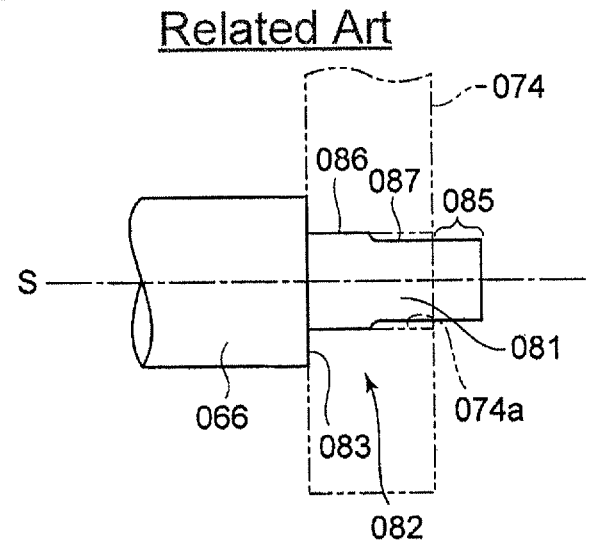
FIG. 9C is an illustration of the related art.

As illustrated in FIG. 8C, at the press-fitting of the nail pin 20 into the press-fitting hole 53b, the outer peripheral surface of the guide part 53a is formed into a smooth circular arc surface.

Therefore, as illustrated in FIG. 8A, by press-fitting the nail pin 20 into the press-fitting hole 53b, the outer peripheral surface of the guide part 53a bulges outward in the radial direction, thereby making the outer peripheral surface of the guide part 53a into a smooth circular arc surface (see FIG. 8C) while allowing for an appropriate clearance between the outer peripheral surface of the guide part 53a and the inner peripheral surface of the drive ring 3.

With this configuration, by predicting in advance a bulge amount of the bulging portion caused by press-fitting the nail pin 20 and removing this section, it is possible to prevent protrusion of the outer peripheral surface of the guide part 53 at the press-fitting of the nail pin 20 and make the outer peripheral surface of the guide part 53 into a smooth circular arc, thereby preventing fixation between the inner peripheral surface of the drive ring 3 and the outer peripheral surface of the guide part 53a.

Further, it is no longer necessary to regulate orientation when press-fitting the nail pin 20. This achieves improved easiness of press-fitting work and reduced cost.

Furthermore, since the nail pin 20 is press-fitted over the entire pin length (20b), perpendicularity of the nail pin 20 with respect to the nozzle mount 53 is stabilized, and it is possible to improve fixing of the nail pin 20.

While the embodiment has been described regarding the nail pin 20 for restricting the drive ring 3 in the thrust direction. However, the embodiment is also applicable to the stopper pin 7 which is configured to restrict the lever plate 1 for varying the vane angle of the nozzle vane 2 illustrated in FIG. 2 when the nozzle vane 2 reaches a specified closed position, so as to restrict the vane angle of the nozzle vane 2 below the specified closed position.

Specifically, the embodiment is widely applicable to the case where the structure of press-fitting a pin into the edge of the outer peripheral part is used and a smooth outer peripheral surface is required.

This embodiment is also applicable to the case where a pin-shape member other than the nail pin, such as the lock pin and the stopper pin for restricting the opening of the nozzle vane, is press-fitted in the nozzle mount.

INDUSTRIAL APPLICABILITY

According to the present invention, it is possible to provide a variable displacement exhaust turbocharger equipped with a variable nozzle mechanism, whereby improved durable reliability is achieved by providing the bulge suppressing portion for absorbing a bulging portion generated at press-fitting of the nail pin in the press-fitting hole formed in the nozzle mount along the axial direction, thereby preventing fixation of the inner peripheral surface of the drive ring and the outer peripheral surface of the guide part.

The invention claimed is:

1. A variable displacement exhaust turbocharger which is equipped with a variable nozzle mechanism and is driven by exhaust gas from an engine, the variable displacement exhaust turbocharger comprising:
a plurality of nozzle vanes supported rotatably by a nozzle mount which is fixed to a case including a turbine casing of the variable displacement exhaust turbocharger;
a drive ring which is interlocked with an actuator and is fitted to an annular guide part protruding from a center part of the nozzle mount in an axial direction;
a plurality of lever plates each of which is fitted to a groove formed in the drive ring at one end via a connection pin and is connected to a first nozzle vane of the plurality of nozzle vanes at the other end;
the variable nozzle mechanism configured to swing the plurality of lever plates by rotation of the drive ring so as to change a vane angle of the plurality of nozzle vanes; and
a press-fitting pin which is press-fit to a side of the nozzle mount at a position closer to a rotation axis than the annular guide part,
wherein a bulge suppressing portion is provided in at least one of the press-fitting pin or a press-fitting hole formed in the axial direction of the nozzle mount so as to absorb and suppress a bulge of an outer peripheral surface of the annular guide part generated when the press-fitting pin is press-fit in the press-fitting hole,
wherein a depth of the press-fitting hole is greater than a thickness of the annular guide part in the axial direction, and the bulge suppressing portion includes a clearance between the press-fitting hole and the press-fitting pin in such a manner that a hole diameter of the press-fitting hole is larger than an outer diameter of the press-fitting pin at at least the thickness of the annular guide part in the axial direction from an insertion side when the press-fitting pin is inserted to the press-fitting hole, and
wherein an entire width of a sliding face of the drive ring in the axial direction is positioned within an entire length of the clearance in the axial direction, and
wherein the clearance extends from an insertion opening for the press-fitting pin defined by the nozzle mount.

2. The variable displacement exhaust turbocharger equipped with a variable nozzle mechanism according to claim 1,
wherein the press-fitting pin includes a flange section that makes contact with a surface of the nozzle mount defining an opening of the press-fitting hole.

3. The variable displacement exhaust turbocharger equipped with a variable nozzle mechanism according to claim 1,
wherein the clearance is formed in the press-fitting pin in such a manner that an outer peripheral part of the press-fitting pin is smaller than a diameter of the press-fitting hole.

4. The variable displacement exhaust turbocharger equipped with a variable nozzle mechanism according to claim 1,
wherein the clearance includes a notch which is formed along an axial direction of the press-fitting pin.

5. The variable displacement exhaust turbocharger equipped with a variable nozzle mechanism according to claim 1,
wherein the clearance is formed by a cylindrical spring pin which has a C-shaped cross-section and a pin which is press-fitted into an inner cylindrical part of the cylindrical spring pin.

6. The variable displacement exhaust turbocharger equipped with a variable nozzle mechanism according to claim 1,
wherein the press-fitting pin is a stopper pin.

7. The variable displacement exhaust turbocharger equipped with a variable nozzle mechanism according to claim 1,
wherein the press-fitting pin is a lock pin.

8. The variable displacement exhaust turbocharger equipped with a variable nozzle mechanism according to claim 1,
wherein a relief R is provided in a section of connection between a protruding portion on a side face of the nozzle mount and the guide part, and
wherein the clearance in the axial direction overlaps the relief R in the axial direction.

* * * * *